United States Patent
Dhawan et al.

(10) Patent No.: US 12,460,155 B2
(45) Date of Patent: Nov. 4, 2025

(54) SUGAR/GLUCONOAMIDE ALKOXYLATE COMPOSITIONS AND USES THEREOF

(71) Applicant: Ecolab USA Inc., St. Paul, MN (US)

(72) Inventors: Ashish Dhawan, Aurora, IL (US); Keith Allen Monk, New Braunfels, TX (US); Carter Martin Silvernail, Lakeville, MN (US); Pradeep Cheruku, Bolingbrook, IL (US)

(73) Assignee: Ecolab USA Inc., St. Paul, MN (US)

( * ) Notice: Subject to any disclaimer, the term of this patent is extended or adjusted under 35 U.S.C. 154(b) by 464 days.

(21) Appl. No.: 17/817,817

(22) Filed: Aug. 5, 2022

(65) Prior Publication Data

US 2023/0044300 A1 Feb. 9, 2023

Related U.S. Application Data

(60) Provisional application No. 63/203,958, filed on Aug. 5, 2021.

(51) Int. Cl.
*C11D 1/00* (2006.01)
*C11D 1/28* (2006.01)
*C11D 1/72* (2006.01)

(52) U.S. Cl.
CPC .... *C11D 1/72* (2013.01); *C11D 1/28* (2013.01)

(58) Field of Classification Search
CPC ........................................................ C11D 3/00
See application file for complete search history.

(56) References Cited

U.S. PATENT DOCUMENTS

| | | | |
|---|---|---|---|
| 1,901,565 | A | 3/1933 | Pasternack et al. |
| 2,662,073 | A | 12/1953 | Mehltretter et al. |
| 2,752,334 | A | 6/1956 | Walton |
| 4,092,253 | A | 5/1978 | Cuntze et al. |
| 4,386,000 | A | 5/1983 | Turner et al. |
| 4,891,160 | A | 1/1990 | Vander Meer |
| 5,521,293 | A | 5/1996 | Vermeer et al. |
| 5,750,733 | A | 5/1998 | Vermeer et al. |
| 6,200,938 | B1 | 3/2001 | Perella et al. |
| 6,211,139 | B1 | 4/2001 | Keys et al. |
| 6,235,914 | B1 | 5/2001 | Steiger et al. |
| 6,376,455 | B1 | 4/2002 | Friedli et al. |
| 6,562,780 | B2 | 5/2003 | Bermejo et al. |

(Continued)

FOREIGN PATENT DOCUMENTS

| CN | 111574711 A | 8/2020 |
|---|---|---|
| DE | 2522219 B1 | 11/1976 |

(Continued)

OTHER PUBLICATIONS

International Search Report and Written Opinion dated Dec. 5, 2022 relating to PCT/US2022/039538, 12 pages.

(Continued)

*Primary Examiner* — Necholus Ogden, Jr.
(74) *Attorney, Agent, or Firm* — Stinson LLP

(57) ABSTRACT

Compositions comprising a sugar alkoxylate and processes for preparing said compositions are provided. The compositions can be used as a bio-film inhibitor, rheology modifier, emulsion breaker, and/or emulsion inverter. Additionally, the compositions can be used in methods of breaking and/or inverting an emulsion of water and oil.

20 Claims, 2 Drawing Sheets

(56) References Cited

U.S. PATENT DOCUMENTS

| | | |
|---|---|---|
| 6,979,440 B2 | 12/2005 | Shefer et al. |
| 6,995,131 B1 | 2/2006 | Frankenbach et al. |
| 7,431,845 B2 | 10/2008 | Manek et al. |
| 7,786,179 B2 | 8/2010 | Talingting-Pabalan et al. |
| 8,268,957 B2 | 9/2012 | Liu et al. |
| 8,540,885 B2 | 9/2013 | Ebert et al. |
| 8,714,249 B1 | 5/2014 | Tang |
| 9,034,813 B2 | 5/2015 | Man et al. |
| 9,103,039 B2 | 8/2015 | Jenkins et al. |
| 9,410,076 B2 | 8/2016 | Reddy et al. |
| 9,555,385 B2 * | 1/2017 | Shen ............. C08L 33/02 |
| 9,944,878 B2 | 4/2018 | Butke et al. |
| 10,005,951 B2 | 6/2018 | Vo et al. |
| 10,538,719 B2 | 1/2020 | Sivik et al. |
| 2005/0014672 A1 | 1/2005 | Arif |
| 2009/0105109 A1 | 4/2009 | Lant et al. |
| 2015/0307788 A1 | 10/2015 | McDaniel et al. |
| 2016/0177162 A1 | 6/2016 | Nguyen et al. |
| 2017/0247798 A1 | 8/2017 | Moloney |
| 2018/0148632 A1 | 5/2018 | Bennett et al. |
| 2019/0223434 A1 | 7/2019 | Balasubramanian et al. |
| 2019/0390141 A1 | 12/2019 | Li et al. |
| 2020/0071265 A1 | 3/2020 | Dhawan et al. |
| 2020/0199485 A1 | 6/2020 | Baum |

FOREIGN PATENT DOCUMENTS

| | | |
|---|---|---|
| EP | 0131865 B1 | 9/1988 |
| EP | 0 550 281 A2 | 7/1993 |
| GB | 866408 | 4/1961 |
| WO | 96/29977 | 10/1996 |
| WO | 97/42281 | 11/1997 |
| WO | 00/58427 | 10/2000 |
| WO | 2009/043708 A1 | 4/2009 |
| WO | 2009/094221 A1 | 7/2009 |
| WO | 2013/092440 | 6/2013 |
| WO | 2017/147487 A1 | 8/2017 |
| WO | 2020/204689 A1 | 10/2020 |

OTHER PUBLICATIONS

International Search Report and Written Opinion dated Oct. 27, 2022 relating to PCT/US2022/039526, 12 pages.

* cited by examiner

SUGAR/GLUCONOAMIDE ALKOXYLATE COMPOSITIONS AND USES THEREOF

CROSS REFERENCE TO RELATED APPLICATIONS

This application claims priority to U.S. Provisional Patent Application Ser. No. 63/203,958 filed on Aug. 5, 2021, the disclosure of which is incorporated herein by reference in its entirety.

FIELD OF THE INVENTION

Compositions comprising a sugar alkoxylate and processes for preparing said compositions are provided. The compositions can be used as a bio-film inhibitor, rheology modifier, drag reducer, viscosity reducer, antifoam agent, emulsion breaker, and/or emulsion inverter. Additionally, the compositions can be used in methods of breaking and/or inverting an emulsion of water and oil.

BACKGROUND OF THE INVENTION

Synthetic or naturally-occurring water-soluble or water-dispersible polymers can be used in a variety of commercial applications.

In certain situations, the polymers may be stored in the form of an inverse emulsion. An "inverse emulsion" refers to an aqueous phase dispersed in a non-aqueous phase, where the aqueous phase and non-aqueous phase are, respectively, the discontinuous and continuous phases. For example, the aqueous phase may be water and the non-aqueous phase may be an oil or organic phase. In such emulsions, polymer molecules such as friction reducers or flocculants can be located inside of aqueous phase droplets that are emulsified in the oil phase. The inverse emulsion form of the polymers facilitates the handling, transport, and metering of the liquid active polymer into any suitable process.

However, before the polymer can be used, the emulsion must undergo inversion so that the polymer is released. The inversion of these inverse emulsions typically produces an aqueous solution that can be ready to use without excessive mixing or solution aging time. It is desirable to have a high rate of inversion and high extent of inversion of these polymer emulsions. A higher rate and extent of inversion results in an increased efficiency of the polymer solution.

To this end, it is necessary to introduce an effective amount of an emulsion breaking composition in order to destabilize the emulsion and release the aqueous phase droplets containing the polymer, emulsified in the oil phase.

There remains a need for new and improved compositions useful for breaking an emulsion. In particular, there remains a need in the art for a new and improved compositions comprising a sugar alkoxylate that are useful as a demulsifier and/or as an inversion agent for polymer emulsions (e.g., water-in-oil polymer emulsions).

BRIEF SUMMARY OF THE INVENTION

Disclosed herein are compositions comprising sugar alkoxylates useful for a variety of applications. For example, the compositions comprising sugar alkoxylates may be useful as a bio-film inhibitor, rheology modifier, drag reducer, viscosity reducer, antifoam agent, emulsion breaker, or emulsion inverter. Also described herein are methods for preparing such compositions.

The compositions comprising sugar alkoxylates may be obtained by first preparing a sugar amide intermediate. For example, a sugar lactone may be reacted with a polyamine to form a sugar amide intermediate. Alternatively, a sugar lactone may be reacted with an alkanolamine to form a sugar amide intermediate. Further, the sugar lactone may be reacted with a combination of a polyamine and an alkanolamine.

The sugar lactone may be any suitable sugar lactone. For example, the sugar lactone may be selected from the group consisting of 1,5-D-gluconolactone, ascorbic acid, 1,4-D-galactonolactone, D-mannono-1,4-lactone, and combinations thereof.

The polyamine may be of formula (I): $H_2N—X—NH_2$, wherein X is $—(CH_2)_m—$, $—(Ar)—$, $—(CH_2Ar)_n—$, $—((CH_2)_oAr(CH_2)_o)_p—$, or $—((CH_2)_qNH(CH_2)_q)_r—$, wherein m, n, o, and q are an integer from 1 to 10 and p and r are an integer from 1 to 100.

The alkanolamine may be a compound of Formula (IV): $NH_2—R—OH$, wherein R is acyclic aliphatic, cyclic aliphatic, or aromatic.

The resulting sugar amide may be a sugar amide of Formula (II), wherein X is $—(CH_2)_m—$, $—(Ar)—$, $—(CH_2Ar)_n—$, $—((CH_2)_oAr(CH_2)_o)_p—$, or $—((CH_2)_qNH(CH_2)_q)_r—$, wherein m, n, o, and q are an integer from 1 to 10 and p and r are an integer from 1 to 100.

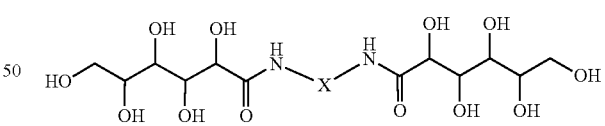

(II)

The sugar amide intermediate is then alkoxylated in the presence of an alkoxylating agent to form a composition comprising a sugar alkoxylate.

The alkoxylating agent may be any suitable alkoxylating agent. For example, the alkoxylating agent may be selected from the group consisting of ethylene oxide, propylene oxide, styrene oxide, butylene oxide, and combinations thereof. Preferably, the akoxylating agent is an alkylene oxide.

The sugar alkoxylate may be a sugar alkoxylate of Formula (III):

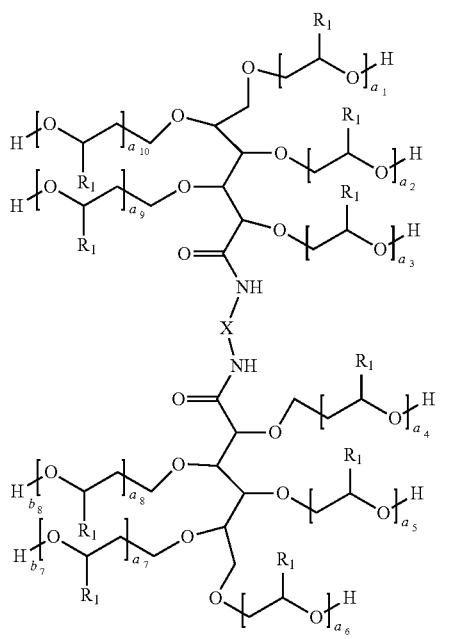

(III)

wherein $a_1$ to $a_{10}$ are integers and the sum of $a_1$ to $a_{10}$ is an integer from 1 to 100 and $R_1$ is hydrogen, alkyl, or aryl.

The sugar alkoxylate may alternatively be a sugar alkoxylate of Formula IIIA:

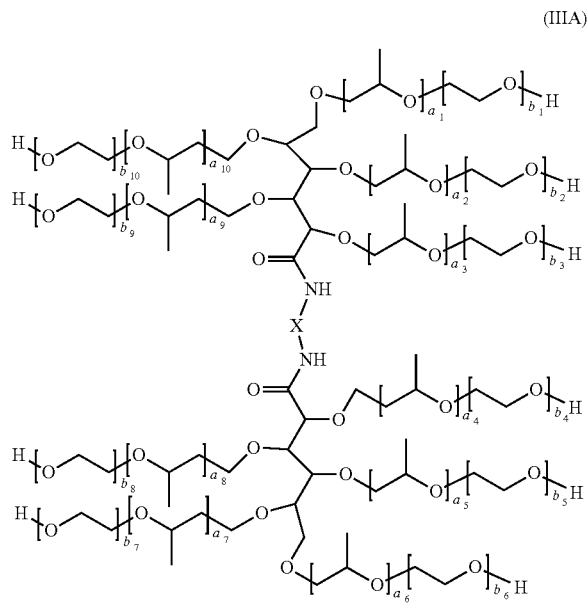

(IIIA)

wherein $b_1$ to $b_{10}$ are integers and the sum of the integers of $b_1$ to $b_{10}$ is 1 to 100.

Described herein are methods of breaking and/or inverting an emulsion of water and oil comprising introducing an effective amount of an emulsion breaker composition into contact with the emulsion to destabilize the emulsion, wherein the emulsion breaker composition comprises a composition comprising a sugar alkoxylate.

Also disclosed are methods of inhibiting bio-film comprising introducing an effective amount of a bio-film inhibitor, wherein the bio-film inhibitor comprises a composition including a sugar alkoxylate described herein.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

Figure 1:
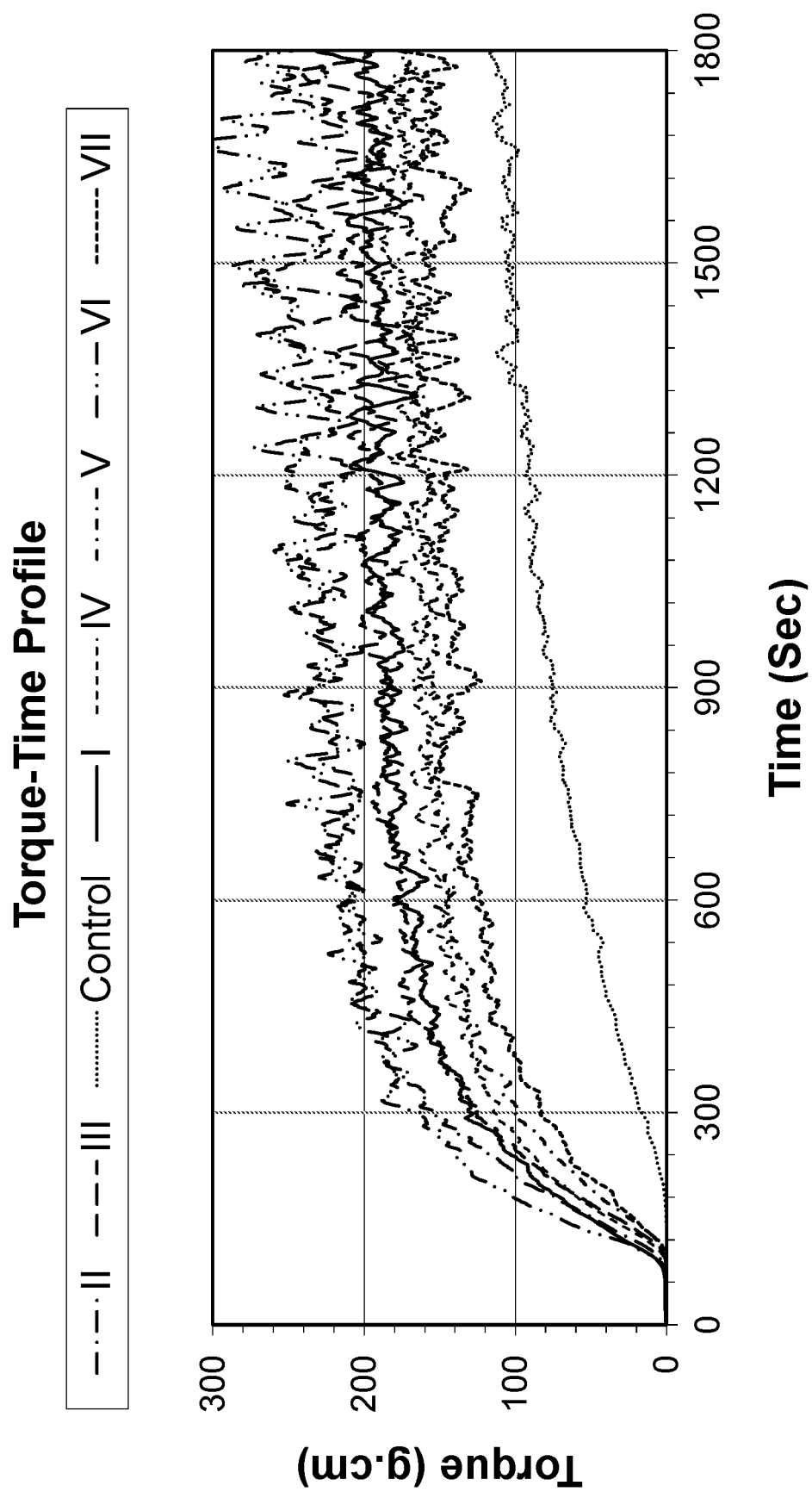
FIG. 1 illustrates the torque profile of the experiment of Example 6 at a temperature of approximately 4° C.

Surfactant compositions comprising a sugar alkoxylate and processes for preparing a composition comprising a sugar alkoxylate are provided herein.

The sugar alkoxylate is generally obtained by a process of reacting a sugar lactone with a polyamine, alkanolamine, or combination thereof to form a sugar amide, and alkoxylating the sugar amide intermediate in the presence of an alkoxylating agent to form a composition comprising a sugar alkoxylate.

Surfactant compositions comprising a sugar alkoxylate have a variety of benefits. Polymers having various utilities (e.g., friction reducers, flocculants, etc.) can be prepared as an emulsion. In particular, the polymer may be prepared as an inverse emulsion.

However, before the polymer can be used, the emulsion must undergo inversion so that the polymer is released. The inversion of these inverse emulsions typically produces an aqueous solution that can be ready to use without excessive mixing or solution aging time. It is desirable to have a high rate of inversion and high extent of inversion of these polymer emulsions to allow for an increased efficiency of the polymer solution.

To this end, it is necessary to introduce an effective amount of a surfactant composition in order to destabilize the emulsion and aid the release of the aqueous phase droplets containing the polymer from the emulsion of the water droplets in the oil phase. The surfactant compositions described herein comprising a sugar alkoxylate are useful for inverting the water-in-oil emulsions.

Other uses of the compositions described herein comprising a sugar alkoxylate include, for example, inhibiting bio-film, emulsion breaking, drag reduction, viscosity reduction, defoamer, acting as a rheology modifier, aiding in latex activation, enhancing surfactant assisted oil recovery, and the like.

Preparing a Sugar Amide Intermediate

As noted above, the sugar alkoxylate is obtained by a process of reacting a sugar lactone with a polyamine, alkanolamine, or combination thereof to form a sugar amide intermediate, and alkoxylating the sugar amide in the presence of an alkoxylating agent to form the sugar alkoxylate. Additionally, a process for preparing a sugar amide intermediate by reacting a sugar lactone with a polyamine, alkanolamine, or a combination thereof is disclosed.

The sugar lactone used to prepare the sugar amide intermediate may be any suitable sugar lactone. For example, the sugar lactone is selected from the group consisting of 1,5-D-gluconolactone, 1,4-D-galactonolactone, D-mannono-1,4-lactone, ascorbic acid, lactide, d-lactone, d-caprolactone, ε-caprolactone, g-butyrolactone, gluonic acid d-lactone, b-propiolactone, coumarin, whiskey lactone, and combinations thereof. Preferably, the sugar lactone is 1,5-D-gluconolactone.

The polyamine used to prepare the sugar amide intermediate may be any suitable polyamine. The polyamine can be of formula (I): $H_2N—X—NH_2$, wherein X is $—(CH_2)_m—$, $—(Ar)—$, $—(CH_2Ar)_n—$, $—((CH_2)_oAr(CH_2)_o)_p—$, or $—((CH_2)_qNH(CH_2)_q)_r—$, wherein m, n, o, and q are an integer from 1 to 10 and p and r are an integer from 1 to 100.

The polyamine may be selected from the group consisting of ethylenediamine, 1,6-hexamethylenediamine, diethylenetriamine, tetraethylenepentamine, 1,3-phenylenediamine, 1,4-phenylenediamine, 1,2-diphenyl-1,2-ethylenediamine, propylenediamine, isopropylenediamine, butylenediamine, piperazine, pentylenediamine piperazine, N,N'-Bis-(2-aminoethyl) piperazine, piperazinoethylethylenediamine, aminoethylpiperazine, triethylenetetramine, pentaethylenehexamine, hexaethyleneheptamine tris(2-aminoethyl)amine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, dimethylaminopropylamine polyethylenepolyamine, and combinations thereof. Preferably, the polyamine is diethylenetriamine (DETA).

When the sugar amide is formed by the reacting a sugar lactone with a polyamine, the desired molar ratio of sugar lactone to polyamine depends on the number of amine groups in the polyamine and may be about 1:1 or greater per amine group. For example, the molar ratio of sugar lactone to polyamine can be about 2:1 or greater, about 3:1 or greater, about 4:1 or greater per amine group. Preferably, the molar ratio of sugar lactone to polyamine is from about 1:1 to about 4:1, or from about 1:1 to about 2:1, per primary amine group.

The sugar lactone is 1,5-D-glucanolactone and the polyamine is of Formula (I): $H_2N—X—NH_2$, wherein X is $—(CH_2)_m—$, $—(Ar)—$, $—(CH_2Ar)_n—$, $—((CH_2)_oAr(CH_2)_o)_p—$, or $—((CH_2)_qNH(CH_2)_q)_r—$, wherein m, n, o, and q are an integer from 1 to 10 and p and r are an integer from 1 to 100. The reaction scheme for this method of preparing the sugar amide is shown below. The sugar amide is of Formula (II), wherein X is defined as in Formula (I).

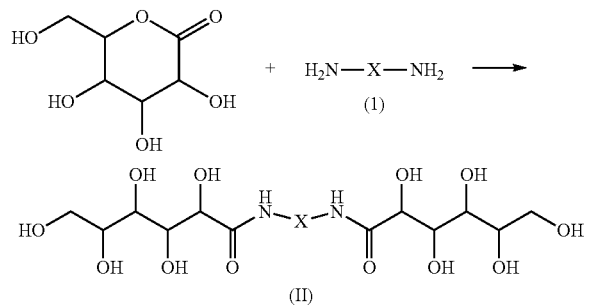

Preferably, the sugar lactone is 1,5-D-gluconolactone and the polyamine is diethylenetriamine (DETA). The reaction results in the sugar amide bis(glucuronylaminoethyl)amine. The reaction mechanism can be seen below.

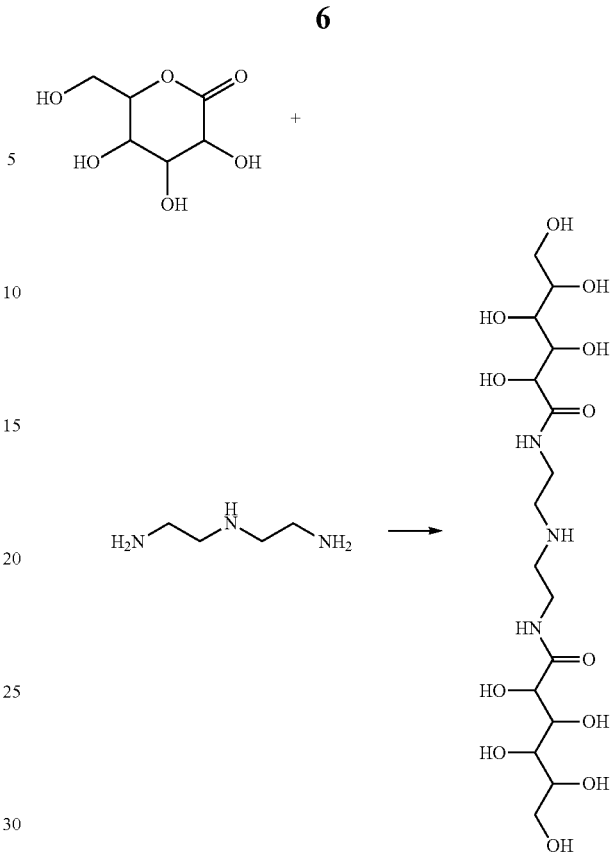

When the sugar amide intermediate is formed by reacting a sugar lactone with an alkanolamine, the alkanolamine used to prepare the sugar amide intermediate may be any suitable alkanolamine. For example, the alkanolamine is a compound of Formula (IV): $NH_2—R—OH$, wherein R is acyclic aliphatic, cyclic aliphatic, or aromatic.

The alkanolamine may be selected from 2-aminoethan-1-ol, 2-aminobutan-1-ol, 1-(aminomethyl)cyclopentan-1-ol, 3-aminopropan-1-ol, 1-aminopropan-2-ol, 4-aminocyclohexan-1-ol, 4-aminobutan-1-ol, 5-aminopentan-1-ol, 2-aminopropane-1,3-diol, 2-aminocyclohexan-1-ol, 2-((3-aminopropyl)amino) ethan-1-ol, 2-amino-2-(hydroxymethyl) propane-1,3-diol, 2-((2-aminoethyl)amino) ethan-1-ol, 2-(2-aminoethoxy) ethan-1-ol, or a combination thereof.

Alternatively, the alkanolamine may be selected from 4-aminophenol, 3-aminophenol, 2-aminophenol, 4-(aminomethyl) phenol, 4-(2-aminoethyl)benzene-1,2-diol, 5-(2-aminoethyl)benzene-1,2,3-triol, 4-(2-aminoethyl) phenol, 2-amino-1-phenylethan-1-ol, 4-(2-amino-1-hydroxyethyl) benzene-1,2-diol, 3-(2-amino-1-hydroxyethyl) phenol, (2-amino-3-methylphenyl) methanol, (3-aminophenyl) methanol, (4-aminophenyl) methanol, 2-(4-aminophenyl) ethan-1-ol, 2-(3-aminophenyl) ethan-1-ol, 4-(aminomethyl) benzene-1,2-diol, 2-(2-aminophenyl) ethan-1-ol, 4-aminobenzene-1,2-diol, (2-aminophenyl) methanol, or a combination thereof.

When the sugar amide is formed by the reacting a sugar lactone with an alkanolamine, the molar ratio of sugar lactone to alkanolamine is typically about 1:1 or greater depending on the number of amine groups in the alkanolamine. For example, the molar ratio of sugar lactone to alkanolamine is about 2:1 or greater, about 3:1 or greater, about 4:1 or greater per amine group in the alkanolamine. Preferably, the molar ratio of sugar lactone to alkanolamine is from about 1:1 to about 4:1, from about 1:1 to about 3:1, from about 1:1 to about 2:1, per primary amine group in the alkanolamine.

The reaction of a sugar lactone with a polyamine, alkanolamine, or a combination thereof can be conducted in the presence of a solvent. For example, the reaction may comprise a polar solvent.

Suitable solvents for the reaction of a sugar lactone with a polyamine, alkanolamine, or a combination thereof include, for example, water, methanol, ethanol, isopropanol, chloroform, heavy aromatic naphtha, light aromatic naphtha, xylenes, ethylene glycol, methyl carbitol, propylene glycol or a derivative thereof, or polyethylene glycol or a derivative thereof. Preferably, the solve is methanol or ethylene glycol.

The sugar amide formed by the reacting a sugar lactone with a polyamine, alkanolamine, or a combination thereof may be any suitable sugar amide for subsequent alkoxylation. For example, the polyamine may be selected from ethylenediamine, 1-6-hexamethylenediamine, diethylenetriamine, tetraethylenepentamine, tris(2-aminoethyl)amine, 1,4-phenylenediamine, 1,3-phenylenediamine, 1,2-diphenyl-1,2-ethylenediamine, or a combination thereof.

The sugar amide can have a structure corresponding to Formula (II), wherein X is $-(CH_2)_m-$, $-(Ar)-$, $-(CH_2Ar)_n-$, $-((CH_2)_oAr(CH_2)_o)_p-$, or $-((CH_2)_qNH(CH_2)_q)_r-$, wherein m, n, o, and q are an integer from 1 to 10 and p and r are an integer from 1 to 100.

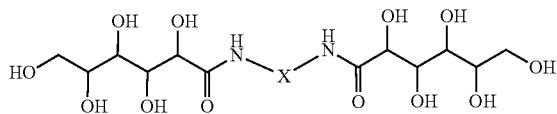

(II)

The reaction of a sugar lactone with a polyamine, alkanolamine, or a combination thereof may be conducted at a temperature of at least about 40° C.

The reaction is conducted at a temperature of between about 20° C. and about 120° C., between about 40° C. and about 80° C., or between about 40° C. and about 60° C.

Additionally, the reaction is preferably conducted at atmospheric pressure.

Alkoxylation of the Sugar Amide

After preparing the sugar amide intermediate as described above, the process further comprises a step of alkoxylating the sugar amide in the presence of an alkoxylating agent to form a composition comprising a sugar alkoxylate.

The alkoxylation reaction comprises alkoxylating the sugar amide in the presence of an alkoxylating agent selected from ethylene oxide, propylene oxide, styrene oxide, butylene oxide, or a combination thereof. Preferably, the alkoxylating agent is an alkylene oxide.

Alkoxylating the sugar amide can comprise two or more alkoxylations, each comprising an alkoxylating agent. The two or more alkoxylations may be conducted in series, in parallel, simultaneously, or any combination thereof. The alkoxylating agents of the two or more alkoxylations may be the same or different. Preferably, the alkoxylations are conducted in series.

Wherein the step of alkoxylating the sugar amide comprises two or more alkoxylations in series, the product of the $n^{th}$ alkoxylation may be fed directly to the $n^{th}+1$ alkoxylation or may be otherwise processed before being directed to the $n^{th}+1$ alkoxylation.

Wherein the step of alkoxylating the sugar amide comprises two or more alkoxylations in parallel, two or more of the alkoxylation products may be combined to form a composition comprising the sugar alkoxylate.

It may be desirable to alkoxylate the sugar amide in the presence of an alkoxylating agent and a catalyst to form a composition comprising a sugar alkoxylate. For example, the catalyst may be selected from the group consisting of potassium hydroxide, sodium hydroxide, ammonium hydroxide, sodium methoxide, potassium methoxide, and combinations thereof. When alkoxylating the sugar amide comprises two or more alkoxylations, a catalyst may be used in one, multiple, or all of the alkoxylations. The catalyst of each alkoxylation may be the same or different.

Alkoxylating the sugar amide can comprise two or more alkoxylations in series, each comprising an alkoxylating agent. The alkoxylating agents of the two or more alkoxylations may be the same or different. For example, the alkoxylation comprises two alkoxylations wherein the first alkoxylation comprises the alkoxylating agent propylene oxide and the second alkoxylation comprises the alkoxylating agent ethylene oxide.

Alternatively, the alkoxylation comprises two alkoxylations wherein the first alkoxylation comprises the alkoxylating agent ethylene oxide and the second alkoxylation comprises the alkoxylating agent propylene oxide.

Further, the alkoxylation can comprise alkoxylating a sugar amide of Formula (II) by a process comprising contacting the sugar amide of Formula (II) with a first alkoxylating agent propylene oxide to form an intermediate composition and contacting the intermediate composition with a second alkoxylating agent ethylene oxide to form the composition comprising a sugar alkoxylate.

Without being bound to the theory, it is believed that the first alkoxylation agent propylene oxide confers a hydrophobic component to the sugar alkoxylate, while the second alkoxylation agent ethylene oxide confers a hydrophilic component to the sugar alkoxylate. The resulting sugar alkoxylate comprises a hydrophobic core of propylene oxide surrounded by a shell of ethylene oxide. The overall hydrophobic/hydrophilic nature of the sugar alkoxylate will depend on both the relative chain lengths of the propylene oxide and ethylene oxide components as well as the ratio of the alkoxylating agents employed. Therefore, when the alkoxylation comprises two alkoxylations, wherein the first alkoxylation comprises the alkoxylating agent propylene oxide and the second alkoxylation comprises the alkoxylating agent ethylene oxide, it may be desirable to utilizes a molar (?) ratio of propylene oxide to ethylene oxide from about 1:20 to about 20:1. For example, the ratio of propylene oxide to ethylene oxide may be from about 1:10 to about 10:1, from about 1:5 to about 10:1, from about 1:2 to about 10:1, from about 1:1 to about 10:1, or from about 2:1 to about 10:1. Preferably, the sugar alkoxylate resulting from these two alkoxylations comprises about 30% ethylene oxide groups based on the total number of propylene oxide and ethylene oxide groups present. For example, no more than about 35%, no more than about 30%, no more than about 25%, no more than about 20%, no more than about 15%, or no more than about 10% ethylene oxide groups based on the total number of propylene oxide and ethylene oxide groups present in the sugar alkoxylate.

Where the sugar amide was formed in the presence of a solvent, it may be desirable to remove at least a portion of the solvent prior to alkoxylation. For example, a water removal step may be conducted before alkoxylating the sugar amide intermediate.

The step of alkoxylating the sugar amide to form the sugar alkoxylate may be conducted at increased temperature and pressure. For example, a temperature of from about 80° C.

to about 200° C. and a pressure of from about 1 bar to about 20 bar.

The step of alkoxylating the sugar amide is conducted at a temperature of from about 80° C. to about 200° C., from about 90° C. to about 200° C., from about 100° C. to about 200° C., from about 100° C. to about 150° C., or from about 130° C. to about 150° C. When the step of alkoxylating the sugar amide comprises two or more alkoxylations, the temperature of each alkoxylation may be the same or different.

Additionally, the step of alkoxylating the sugar amide is conducted a pressure of from about 1 bar to about 20 bar, from about 2 bar to about 20 bar, from about 3 bar to about 20 bar, from about 4 bar to about 20 bar, from about 5 bar to about 20 bar, or from about 10 bar to about 20 bar, or from about 10 bar to about 14 bar. When the step of alkoxylating the sugar amide comprises two or more alkoxylations, the pressure of each alkoxylation may be the same or different.

The average degree of alkoxylation of the resulting sugar alkoxylate ranges from about 1 percent to about 100 percent. For example, from about 5 to about 100 percent, from about 10 to about 100 percent, from about 15 to about 100 percent, from about 20 to about 100 percent, from about 25 to about 100 percent, from about 30 to about 100 percent, from about 35 to about 100 percent, from about 40 to about 100 percent, from about 45 to about 100 percent, from about 50 to about 100 percent, from about 55 to about 100 percent, from about 60 to about 100 percent, from about 65 to about 100 percent, from about 70 to about 100 percent, from about 75 to about 100 percent, from about 80 to about 100 percent, from about 85 to about 100 percent, from about 90 to about 100 percent, or from about 95 to about 100 percent.

The resulting sugar alkoxylate has an average molecular weight of from about 100 to about 50,000 daltons. For example, from about 200 to about 50,000, from about 300 to about 50,000, from about 400 to about 50,000, from about 500 to about 50,000, from about 500 to about 40,000, from about 500 to about 30,000, from about 500 to about 20,000, or from about 500 to about 10,000 daltons.

The sugar alkoxylate may be a sugar alkoxylate of Formula (III):

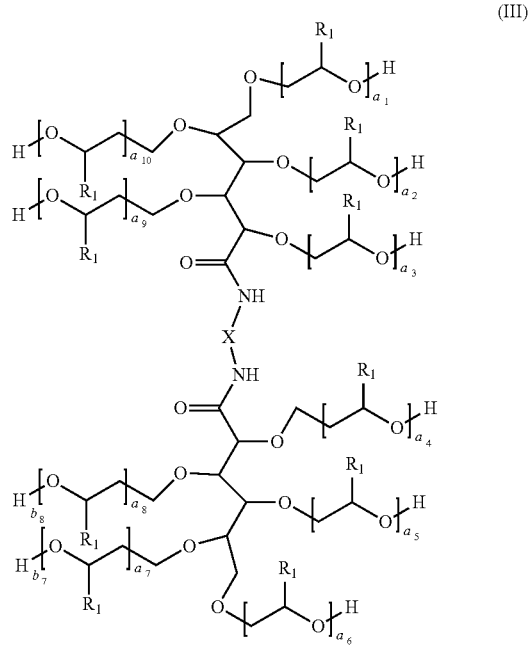

(III)

wherein X is $-(CH_2)_m-$, $-(Ar)-$, $-(CH_2Ar)_n-$, $-((CH_2)_oAr(CH_2)_o)_p-$, or $-((CH_2)_qNH(CH_2)_q)_r-$, wherein m, n, o, and q are an integer from 1 to 10 and p and r are an integer from 1 to 100; and wherein $a_1$ to $a_{10}$ are integers and the sum of $a_1$ to $a_{10}$ is an integer from 1 to 100 and $R_1$ is hydrogen, alkyl, or aryl.

For example, $R_1$ is hydrogen, $C_1$ to $C_3$ alkyl, or phenyl; preferably, $R_1$ is hydrogen or methyl.

Particularly, the sugar alkoxylate may be a sugar alkoxylate of Formula (IIIA):

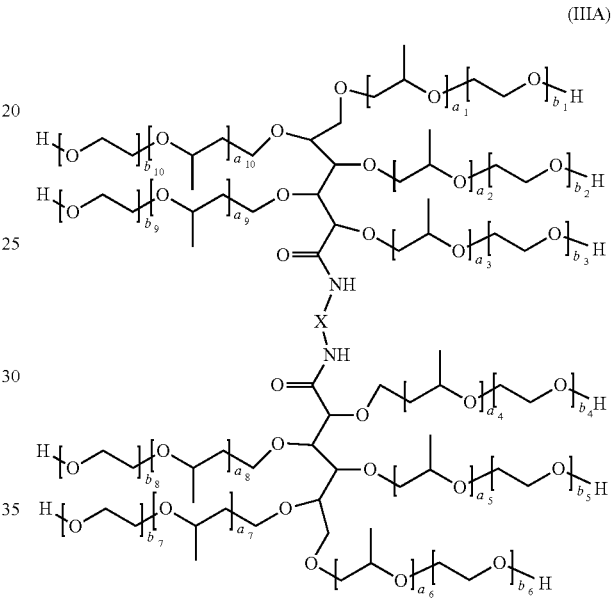

(IIIA)

wherein X is $-(CH_2)_m-$, $-(Ar)-$, $-(CH_2Ar)_n-$, $-((CH_2)_oAr(CH_2)_o)_p-$, or $-((CH_2)_qNH(CH_2)_q)_r-$, wherein m, n, o, and q are an integer from 1 to 10 and p and r are an integer from 1 to 100; and wherein $b_1$ to $b_{10}$ are integers and the sum of the integers of $b_1$ to $b_{10}$ is 1 to 100.

The step of alkoxylation comprises a series of alkoxylations comprising contacting the sugar amide with a first alkoxylating agent propylene oxide (i.e. propoxylation) followed by contacting the resulting product with a second alkoxylating agent ethylene oxide (i.e. ethoxylation). For example, the alkoxylation reactions may follow the reaction scheme set forth below comprising propoxylation reaction (a) and ethoxylation reaction (b). In the below reactions, X is $-(CH_2)_m-$, $-(Ar)-$, $-(CH_2Ar)_n-$, $-((CH_2)_oAr(CH_2)_o)_p-$, or $-((CH_2)_qNH(CH_2)_q)_r-$, wherein m, n, o, and q are an integer from 1 to 10 and p and r are an integer from 1 to 100; $a_1$ to $a_{11}$ are integers and the sum of the integers of $a_1$ to an is 1 to 100; and $b_1$ to $b_{11}$ are integers and the sum of the integers of $b_1$ to bin is 1 to 100.

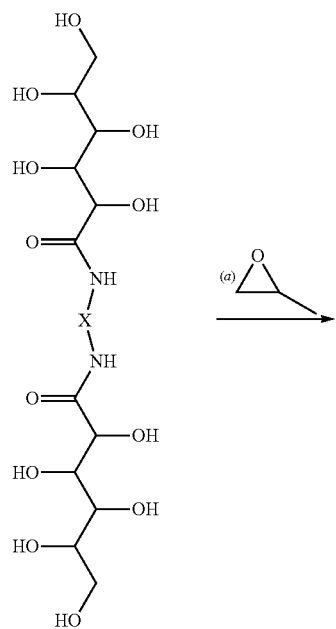

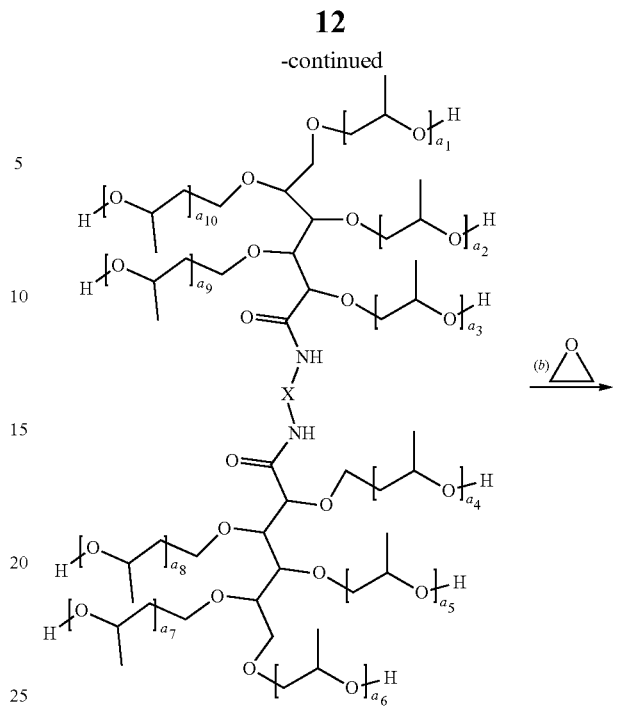

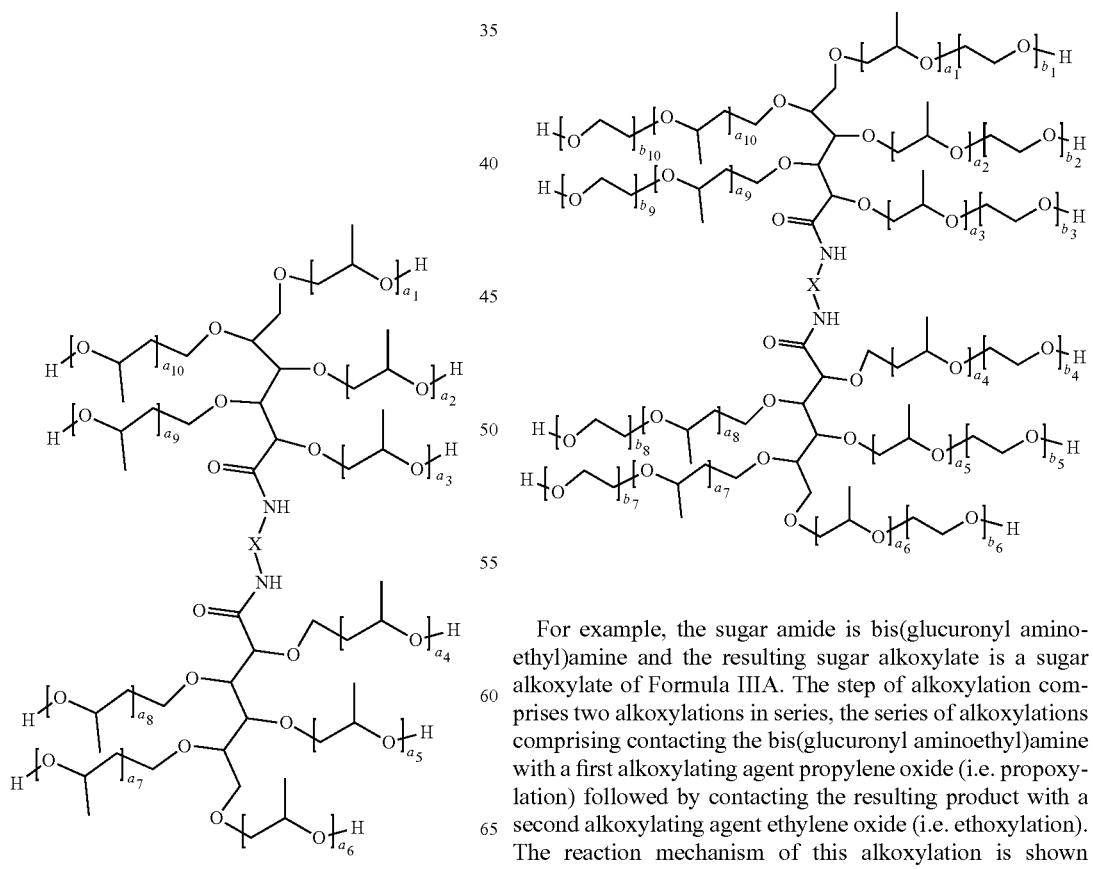

For example, the sugar amide is bis(glucuronyl aminoethyl)amine and the resulting sugar alkoxylate is a sugar alkoxylate of Formula IIIA. The step of alkoxylation comprises two alkoxylations in series, the series of alkoxylations comprising contacting the bis(glucuronyl aminoethyl)amine with a first alkoxylating agent propylene oxide (i.e. propoxylation) followed by contacting the resulting product with a second alkoxylating agent ethylene oxide (i.e. ethoxylation). The reaction mechanism of this alkoxylation is shown below.

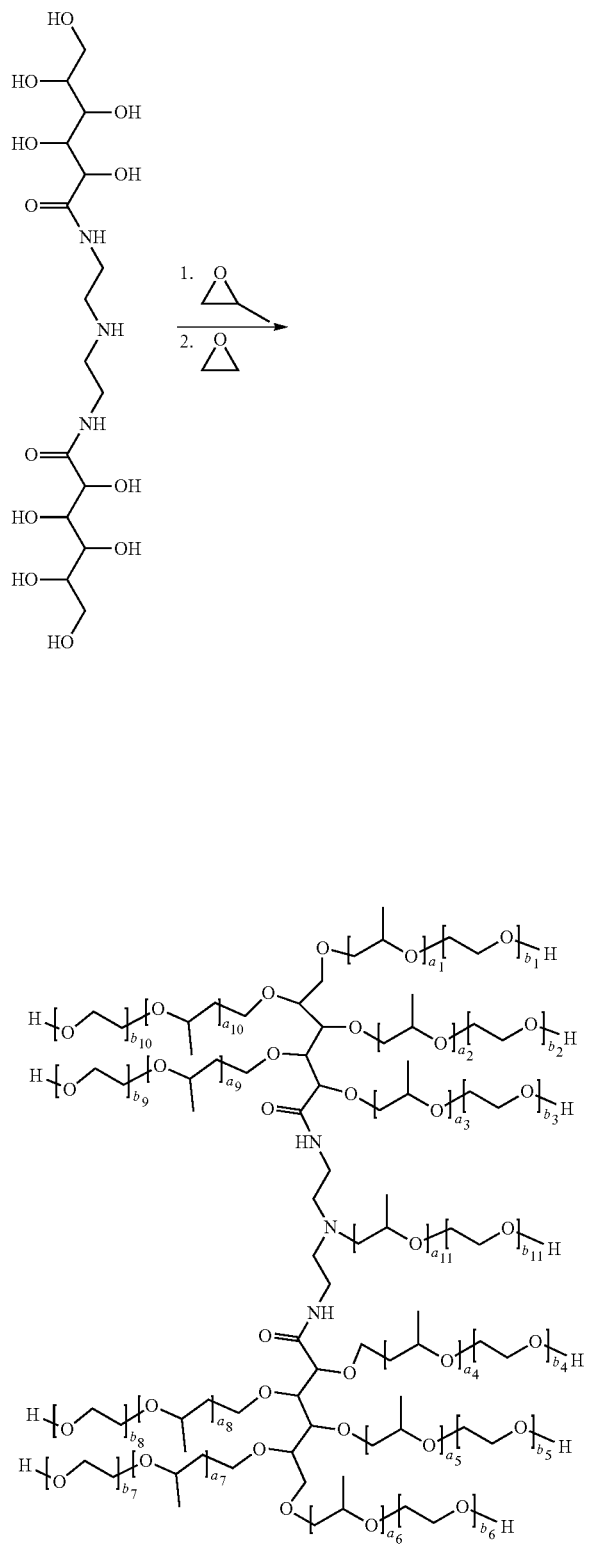

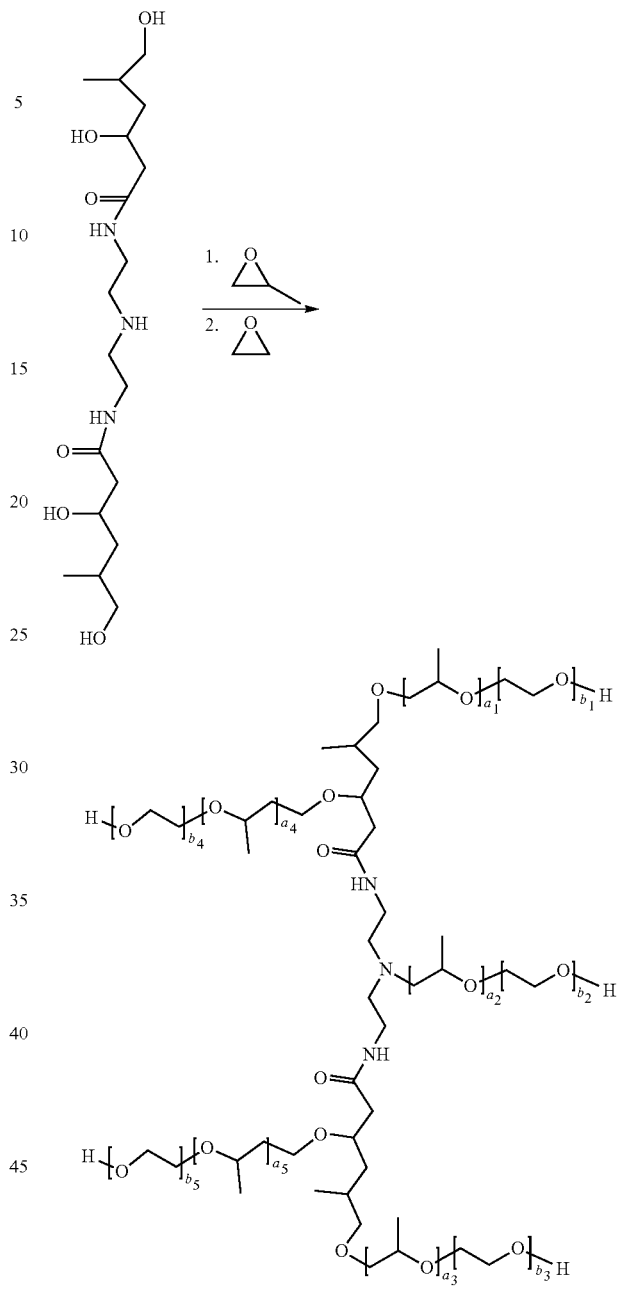

wherein $a_1$ to $a_{11}$ are integers and the sum of the integers of $a_1$ to an is 1 to 100 and wherein $b_1$ to $b_{11}$ are integers and the sum of the integers of $b_1$ to $b_{11}$ is 1 to 100.

Additionally, the alkoxylation reaction comprises a propoxylation reaction (1) and an ethoxylation reaction (2) in series as shown below.

Also discloses here are polymer compositions comprising a water-in-oil emulsion comprising an aqueous phase comprising water and a water-soluble or water-dispersible polymer, and an oil phase comprising an oil and an emulsifying agent; an inverting surfactant; and the surfactant composition described herein.

The polymer compositions can have the water-in-oil emulsion further comprise the surfactant composition described herein.

The polymer compositions can further comprise an aqueous solution containing the surfactant composition described herein.

Also disclosed is a method of dissolving the water-soluble or water-dispersible polymer of the polymer composition disclosed herein comprising contacting the water-in-oil emulsion with the surfactant composition described herein.

The water-in-oil emulsion can further comprise the surfactant composition described herein and the water-in-oil emulsion is contacted with an aqueous solution.

The water-in-oil emulsion can be contacted with an aqueous solution comprising the surfactant composition described herein.

The water-in-oil polymer emulsion can further comprise an emulsifying agent. The emulsifying agent can be a surfactant or blend of surfactants that have a low hydrophile-lipophile balance (HLB) to aid preparation of an oil-continuous emulsion. Appropriate surfactants for water-in-oil emulsion polymerizations which are commercially available are compiled in the North American Edition of McCutcheon's Emulsifiers & Detergents. For example, the emulsifying agent can comprise nonionic ethoxylated fatty acid esters, ethoxylated sorbitan fatty acid esters, sorbitan esters of fatty acids such as sorbitan monolaurate, sorbitan monostearate, and sorbitan monooleate, block copolymers of ethylene oxide and hydroxyacids having a $C_{10}$-$C_{30}$ linear or branched hydrocarbon chain, linear or branched alcohol alkoxylates, or a combination thereof.

The emulsifying agent can be a single nonionic surfactant or blend thereof having a combined HLB value of about 2 to 10, for example about 3 to 10, or about 4 to 10, or about 5 to 10, or about 6 to 10, or about 7 to 10, or about 8 to 10, or about 2 to 9, or about 2 to 8, or about 2 to 7, or about 2 to 6, or about 2 to 5, or about 3 to 9, or about 4 to 8.

The water-in-oil emulsion can also comprise an inverting surfactant. For example, the inverting surfactant of interest includes those listed in the following table and combinations thereof.

| Trade Name | Chemistry | Trade Name |
| --- | --- | --- |
| Alfonic 1412-7 | Ethoxylated $C_{10}$-$C_{16}$ alcohols | Alfonic 1412-7 |
| Novel 23E9 | $C_{12}$-$C_{13}$ primary alcohol of linear and mono-methyl branched alcohols having on average 9 moles EO | Novel 23E9 |
| Synperonic A11 | Ethoxylate of a saturated $C_{12-15}$ alcohol | Synperonic A11 |
| Surfonic 1412-12 | Ethoxylated $C_{12-14}$ alcohol | Surfonic 1412-12 |
| Synperonic 13/7 | Ethoxylated primary branched saturated $C_{13}$ alcohol | Synperonic 13/7 |
| Lutensol TO10 | Ethoxylated $C_{10}$ Guerbet alcohol | Lutensol TO10 |
| Lutensol TO12 | Ethoxylated saturated iso-$C_{13}$ alcohol | Lutensol TO12 |
| Lutensol AO11 | Saturated, predominantly unbranched $C_{13-15}$ oxo alcohols having 11 EO groups | Lutensol AO11 |
| Tergitol 15-S-9 | Secondary Alcohol Ethoxylate | Tergitol 15-S-9 |
| Tergitol 15-S-12 | Secondary Alcohol Ethoxylate | Tergitol 15-S-12 |
| Plurafac RA 20 | Nonionic, alkoxylated alcohol | Plurafac RA 20 |
| Plurafac RA 30 | Nonionic, alkoxylated alcohol | Plurafac RA 30 |
| Synperonic A9 | Polyoxyethylene (9) synthetic primary $C_{13}$/$C_{15}$ alcohol | Synperonic A9 |
| Alfonic TDA9 | Isotridecyl alcohol ethoxylated with an average of 9 moles EO | Alfonic TDA9 |
| Novel 1412-11 | Ethoxylated linear primary $C_{12-14}$ alcohol | Novel 1412-11 |
| Tergitol NP-9.5 | Ethoxylated nonylphenol | Tergitol NP-9.5 |
| Tergitol NP-10.5 | Ethoxylated nonylphenol | Tergitol NP-10.5 |
| Triton X-114 | tert-octylphenoxypoly(ethoxyethanol) | Triton X-114 |
| Rhodafac RS-410 | Tridecyl ether phosphate | Rhodafac RS-410 |
| Ethomeen S/15 | Polyoxyethylene (5) soyaallylamines | Ethomeen S/15 |
| Ethox MO-9 | PEG 400 monooleate | Ethox MO-9 |
| Ethox MO-14 | PEG 600 monooleate | Ethox MO-14 |
| Ethox CO-25 | PEG-25 Castor oil | Ethox CO-25 |
| Alkamul EL-620 | PEG-30 Castor oil | Alkamul EL-620 |
| Ethox CO-40 | PEG-40 Castor oil | Ethox CO-40 |
| Rhodafac RS-710 | Aliphatic phosphate ester, 10 moles EO | Rhodafac RS-710 |
| Rhodafac RS-610 | Aliphatic phosphate ester, 6 moles EO | Rhodafac RS-610 |
| Serdox NXC-14 | Oleic acid monoethanol amide + 14 EO | Serdox NXC-14 |
| Ethomeen S/25 | Soyamine ethoxylate | Ethomeen S/25 |

The inverting surfactant can be an alcohol alkoxylate. The alcohol alkoxylate can comprise a linear or branched alcohol ethoxylate, or a combination thereof. Preferably, the alcohol alkoxylate is an ethoxylated alcohol blend of $C_{11}$-$C_{14}$ isoalkanes.

The surfactant compositions, as described above, are useful as inverters (activators) of water-in-oil (inverse) emulsion polymers in various industries including for water clarification, biofilm inhibition, rheology modification, latex activation, in various processes including papermaking, sewage and industrial water treatment, drilling mud stabilization, and enhanced oil recovery.

The water-soluble or water-dispersible polymers useful in the polymer compositions include various polymers and their mixtures, or derivatives. The water-soluble or water-dispersible polymers used can be an anionic, a cationic, a nonionic, a zwitterionic, or an amphoteric polymer.

For example, the water-soluble or water-dispersible polymers contained in the polymer compositions can comprise polyacrylamides, polyacrylates, copolymers thereof, and hydrophobically modified derivatives of these polymers.

Further, the water-soluble or water-dispersible polymers used in the polymer compositions described herein can include the water-soluble or water-dispersible polymers described in U.S. Pat. Nos. 3,624,019 and 3,734,873; the water-soluble or water-dispersible polymers can have various architectures as disclosed in EP 202780 (linear and cross-linked), and EP 374458, U.S. Pat. Nos. 5,945,494 and 5,961,840 (branched). Additionally, the water-soluble or water-dispersible polymers can contain hydrophobic monomers as disclosed in U.S. Pat. No. 4,918,123. These references are herein incorporated by reference for their various disclosures of water-soluble and water-dispersible polymers.

The polymers usefully incorporated in the polymer compositions typically have a weight average molecular weight (Mw) of about 500,000 Daltons to about 100,000,000 Daltons, or about 1,000,000 Daltons to about 50,000,000 Daltons, or about 5,000,000 Daltons to about 30,000,000 Daltons.

The water-soluble or water-dispersible polymer can comprise about 1 mol % to about 100 mol % acrylamide monomers, or about 1 mol % to about 90 mol %, or about 1 mol % to about 80 mol %, or about 1 mol % to about 70 mol %, or about 1 mol % to about 60 mol %, or about 1 mol % to about 50 mol %, or about 1 mol % to about 40 mol %, or about 1 mol % to about 30 mol %, or about 1 mol % to about 20 mol %, or about 1 mol % to about 10 mol %, or about 10 mol % to about 100 mol %, or about 20 mol % to about 100 mol %, or about 30 mol % to about 100 mol %, or about 40 mol % to about 100 mol %, or about 50 mol % to about 100 mol %, or about 60 mol % to about 100 mol %, or about 70 mol % to about 100 mol %, or about 80 mol % to about 100 mol %, or about 90 mol % to about 100 mol %, or about 20 mol % to about 80 mol, or about 30 mol % to about 70 mol %, or about 40 mol % to about 60 mol %, or about 60 mol % to about 80 mol % acrylamide monomers.

The water-soluble polymer or water-dispersible polymer can be present within the water-in-oil emulsion at about 15 wt % to 70 wt %, or about 17 wt % to 70 wt %, or about 19 wt % to 70 wt %, or about 21 wt % to 70 wt %, or about 23 wt % to 70 wt %, or about 25 wt % to 70 wt %, or about 15 wt % to 68 wt %, or about 15 wt % to 66 wt %, or about 15 wt % to 64 wt %, or about 15 wt % to 62 wt %, or about 15 wt % to 60 wt %, or about 15 wt % to 58 wt %, or about 15 wt % to 56 wt %, or about 25 wt % to 65 wt %, or about 30 wt % to 60 wt %, or about 30 wt % to 60 wt % based on the total weight of the emulsion.

Inverse emulsion polymers are prepared by dissolving the required monomers in the water phase, dissolving the emulsifying agent in the oil phase, emulsifying the water phase in the oil phase to prepare a water-in-oil emulsion, homogenizing the water-in-oil emulsion and polymerizing the monomers to obtain the polymer. A self-inverting surfactant may be added to the water-soluble polymer dispersed within the hydrocarbon matrix to obtain a self-inverting water-in-oil emulsion. Alternatively, a polymer solution can be made-up by inverting the polymer dispersed in oil in to water containing the surfactant.

Also present in the water-in-oil emulsion is an amount of water sufficient to form an aqueous (i.e. water) phase within the emulsion. Water is present in the water-in-oil emulsion at about 3 wt % to 50 wt %, or about 5 wt % to 50 wt %, or about 10 wt % to 50 wt %, or about 15 wt % to 50 wt %, or about 20 wt % to 50 wt %, or about 25 wt % to 50 wt %, or about 3 wt % to 35 wt %, or about 3 wt % to 30 wt %, or about 3 wt % to 25 wt %, or about 5 wt % to 45 wt %, or about 5 wt % to 40 wt %, or about 5 wt % to 35 wt %, based on the total weight of the water-in-oil emulsion.

The water-in-oil emulsion also contains an amount of oil sufficient to form an oil phase within the water-in-oil emulsion.

The oil in the oil phase can be a mixture of compounds, wherein the mixture is less than 0.1 wt % soluble in water at 25° C. and is a liquid over the range of 20° C. to 90° C.

The oil in the oil phase can comprise a linear, branched, or cyclic hydrocarbon moieties, aryl or alkaryl moieties, or combinations thereof.

The oil in the oil phase can have a density of about 0.8 g/L to 1.0 g/L, for example about 0.8 g/L to 0.9 g/L.

Examples of suitable oils for the oil phase can include a petroleum distillate, decane, dodecane, isotridecane, cyclohexane, toluene, xylene, paraffin oil, and mixed paraffin solvents such as those sold under the trade name ISOPAR® by ExxonMobil Corp. of Irving, Texas.

The oil phase is present in the water-in-oil emulsion at about 10 wt % to 40 wt %, or about 15 wt % to 40 wt %, or about 20 wt % to 40 wt %, or about 22 wt % to 40 wt %, or about 24 wt % to 40 wt %, or about 26 wt % to 40 wt %, or about 28 wt % to 40 wt %, or about 30 wt % to 40 wt %, or about 10 wt % to 38 wt %, or about 10 wt % to 36 wt %, or about 10 wt % to 34 wt %, or about 10 wt % to 32 wt %, or about 10 wt % to 30 wt %, or about 10 wt % to 25 wt %, or about 10 wt % to 20 wt %, or about 15 wt % to 35 wt %, or about 20 wt % to 30 wt % based on the total weight of the water-in-oil emulsion.

The surfactant compositions described herein aid the inversion of the water-in-oil emulsion compared to a water-in-oil emulsion comprising no surfactant composition or compared to a water-in-oil emulsion comprising an inverting surfactant and no surfactant composition described herein. The surfactant compositions described in the present disclosure increase the speed and/or percent completion of the inversion process compared to a water-in-oil emulsion comprising no surfactant composition described herein or compared to a water-in-oil emulsion comprising an inverting surfactant and no surfactant composition described herein.

To aid inversion of a water-in-oil emulsion, the surfactant composition is added to the emulsion at about 0.1 wt % to 20.0 wt % based on the total weight of the emulsion, or about 0.1 wt % to 15.0 wt %, or about 0.1 wt % to 10.0 wt %, or about 0.1 wt % to 7.5 wt %, or about 0.1 wt % to 5.0 wt %, or about 0.1 wt % to 4.5 wt %, or about 0.1 wt % to 4.0 wt %, or about 0.1 wt % to 3.5 wt %, or about 0.1 wt % to 3.0 wt %, or about 0.1 wt % to 2.5 wt %, or about 0.1 wt % to 2.0 wt %, or about 0.5 wt % to 5.0 wt %, or about 0.5 wt % to 4.0 wt %, or about 0.5 wt % to 3.0 wt %, or about 0.5 wt % to 2.5 wt %, or about 0.5 wt % to 2.0 wt %, or about 0.5 wt % to 1.5 wt %, based on the total weight of the emulsion.

The surfactant composition can be added to the aqueous solution contacted with the emulsion to activate the polymer in a concentration of about 0.1 wt % to 20.0 wt % based on the total weight of the emulsion, or about 0.1 wt % to 15.0 wt %, or about 0.1 wt % to 10.0 wt %, or about 0.1 wt % to 7.5 wt %, or about 0.1 wt % to 5.0 wt %, or about 0.1 wt % to 4.5 wt %, or about 0.1 wt % to 4.0 wt %, or about 0.1 wt % to 3.5 wt %, or about 0.1 wt % to 3.0 wt %, or about 0.1 wt % to 2.5 wt %, or about 0.1 wt % to 2.0 wt %, or about 0.5 wt % to 5.0 wt %, or about 0.5 wt % to 4.0 wt %, or about 0.5 wt % to 3.0 wt %, or about 0.5 wt % to 2.5 wt %, or about 0.5 wt % to 2.0 wt %, or about 0.5 wt % to 1.5 wt %, based on the total weight of the aqueous solution.

The effective amount of the polymer composition can be from about 1 ppm to about 10000 ppm, from about 1 ppm to about 9000 ppm, from about 1 ppm to about 8000 ppm, from about 1 ppm to about 7000 ppm, from about 1 ppm to about 6000 ppm, from about 1 ppm to about 5000 ppm, from about 1 ppm to about 4000 ppm, from about 1 ppm to about 3000 ppm, from about 1 ppm to about 2000 ppm, from about 1 ppm to about 1000 ppm, based on the total weight of the process fluid. Preferably, the effective amount of the polymer composition is from about 1 ppm to about 900 ppm, from about 1 ppm, to about 800 ppm, from about 1 ppm to about 700 ppm, from about 1 ppm to about 600 ppm, or from about 1 ppm to about 500 ppm. Further, the effective amount of the polymer composition can be from about 1 ppm to about 250 ppm, from about 1 ppm to about 200 ppm, from about 1 ppm to about 100 ppm, from about 1 ppm to about 75 ppm, from about 1 ppm to about 50 ppm, from about 1 ppm to about 25 ppm, from about 1 ppm to about 15 ppm, or from about 1 ppm to about 10 ppm, based on the total weight of the process fluid.

The inversion and dilution to a target concentration of less than 1 wt % can be accomplished in about 1 to 15 minutes, for example about 1 to 30, 1 to 25, 1 to 20, 1 to 15, 1 to 10, 3 to 30, 3 to 25, 3 to 20, 3 to 15, 3 to 10, 5 to 30, 5 to 25, 5 to 20, 5 to 15, or 5 to 10 minutes.

After inversion, the aqueous solutions can comprise about 100 ppm to 10,000 ppm (0.01 wt % to 1.00 wt %) water-soluble or water-dispersible polymer, or about 200 ppm to 5000 ppm, or about 200 ppm to 4000 ppm, or about 200 ppm to 3000 ppm, or about 200 ppm to 2500 ppm water-soluble or water-dispersible polymer, based on the total weight of the aqueous solution.

As used herein, the term "polymer" means a water-soluble or water-dispersible polymer. The term "polymer" encompasses and includes homopolymers, copolymers, terpolymers and polymers with more than three monomers, cross-linked or partially crosslinked polymers, and combinations or blends of these.

As used herein, the term "polymer solution" or "polymer dispersion" means a polymer composition substantially dispersed or dissolved in water, a water source, or a water-based solution. Water-based solutions include one or more dissolved salts, buffers, acids, bases, surfactants, or other dissolved, dispersed, or emulsified compounds, materials, components, or combinations thereof.

As used herein, "inverse emulsion polymer" and "inverse latex polymer" mean a water-in-oil polymer emulsion comprising a water-soluble polymer (which could be cationic, anionic, nonionic, amphoteric polymer, or zwitterionic) in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and generally another surfactant. See U.S. Pat. No. 3,734,873, incorporated herein by reference.

As used herein, the term "water source" means a source of water comprising, consisting essentially of, or consisting of fresh water, deionized water, distilled water, produced water, municipal water, waste water such as runoff water or municipal waste water, treated or partially treated waste water, well water, brackish water, "gray water", sea water, or a combination of two or more such water sources as determined by context. A water source can include one or more salts, ions, buffers, acids, bases, surfactants, or other dissolved, dispersed, or emulsified compounds, materials, components, or combinations thereof.

As used herein, the terms "water-in-oil emulsion" mean a discontinuous internal water phase within a continuous oil phase, wherein the water phase includes at least one monomer or polymer. In general and as determined by context, these terms denote an emulsion prior to addition of inversion surfactants.

As used herein, the term "oil" or "hydrocarbon solvent" as applied to an oil phase of a water-in-oil emulsion, means any compound or blend thereof that is less than 0.1 wt % soluble in water at 25° C., is substantially chemically inert within a water-in-oil emulsion as described herein, and is a liquid over at least the range of 20° C. to 100° C.

As used herein, the term "water phase" means a water source having at least a monomer or polymer dispersed or dissolved therein, further wherein the dispersion or solution is a discontinuous phase within a water-in-oil emulsion.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., arylalkyl) denote optionally substituted homocyclic aromatic groups, preferably monocyclic or bicyclic groups containing form 6 to 12 carbon atoms in the ring portion, such as phenyl, biphenyl, naphthyl, substituted phenyl, substituted biphenyl, or substituted naphthyl. Phenyl and substituted phenyl are the more preferred aryl groups. The term "aryl" also includes heteroaryl functional groups.

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

The term "substituted," as in "substituted aryl," "substituted alkyl," and the like, means that in the group in question (i.e., the alkyl, aryl, or other group that follows the term), at least one hydrogen atom bound to a carbon atom is replaced with one or more substituent groups such as hydroxy (—OH), alkylthio, amido (—CON($R_A$)($R_B$), wherein $R_A$ and $R_B$ are wherein $R_A$ and $R_B$ are independently hydrogen, alkyl, or aryl), amino (—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

Compositions comprising a sugar alkoxylate described above may be useful for a variety of applications. For example, the surfactant compositions described herein can be used as a bio-film inhibitor, rheology modifier, emulsion breaker, and/or emulsion inverter comprising a composition comprising a sugar alkoxylate. The compositions may also be useful as aiding in latex activation or enhancing surfactant assisted oil recovery.

The compositions described herein can further be used in methods of breaking and/or inverting an emulsion of water and oil comprising introducing an effective amount of an emulsion breaker composition into contact with the emulsion to destabilize the emulsion, wherein the emulsion breaker composition comprises a composition comprising a sugar alkoxylate.

The compositions can further be used in methods of inhibiting bio-film comprising introducing an effective amount of a bio-film inhibitor, wherein the bio-film inhibitor comprises a sugar alkoxylate.

Additionally, the compositions can be used in methods of surfactant assisted oil recovery comprising introducing an effective amount of the composition comprising a sugar alkoxylate.

Further, the compositions can be used in methods of latex activation comprising introducing an effective amount of the composition comprising a sugar alkoxylate.

Having described the invention in detail, it will be apparent that modifications and variations are possible without departing from the scope of the invention defined in the appended claims.

EXAMPLES

The following non-limiting examples are provided to further illustrate the present invention.

Example 1

A series of compositions comprising sugar alkoxylates were prepared. Initially, a reaction was conducted in order to prepare a sugar amide intermediate. The sugar amide intermediate was prepared through the reaction of a sugar lactone and a polyamine. The sugar lactone was 1,5-D-gluconolactone and the polyamine was diethylenetriamine (DETA). The molar ratio of DETA to 1,5-D-gluconolactone was approximately 1:2. The general reaction scheme is shown below.

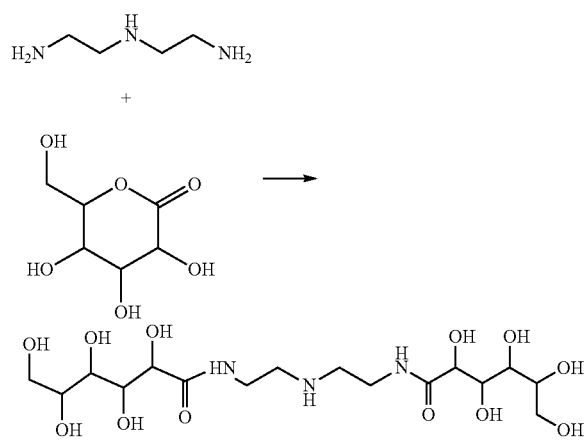

The reaction was conducted by adding 356.28 g of 1,5-D-gluconolactone and 1,200 ml of methanol to a reactor and stirring for approximately 15 minutes to obtain a clear solution. 103.17 g of DETA was then added to the reactor over a period of 30 minutes to form a reaction solution. The reaction solution was stirred overnight at approximately 40° C. Stirring was then stopped and a white precipitate was filtered and removed from the reaction solution. The precipitate was washed with methanol and dried.

The resulting sugar amide solid was a pure white solid having a melting point of approximately 148.2° C. to 149.7° C.

Example 2

A sugar amide solid was prepared according to the method of Example 1. The sugar amide was then alkoxylated by treating the sugar amide with a first alkoxylating agent propylene oxide and then treating the resulting product with a second alkoxylating agent ethylene oxide.

The sugar amide of Example 1 was combined with a heavy aromatic naphtha (HAN) solvent and a catalytic amount of a 50% potassium hydroxide solution to form a reaction solution. The reaction solution was then charged into a reactor. The reactor was heated to approximately 110° C. and the reaction solution was dehydrated under a nitrogen purge until a water content of less than about 0.1 wt. % was measured.

The reactor was loaded with 10 psi of nitrogen atmosphere and the reactor was heated to approximately 130° C. Propylene oxide was added to the reactor until the pressure reached approximately 60 psi. As the pressure in the reactor began to decrease, additional propylene oxide was added to maintain a pressure of approximately 60 psi. Sufficient propylene oxide was added to the reactor to allow for the desired reaction with the sugar amide. The reactor was then returned to standard conditions.

After the reactor had achieved standard conditions, the reactor was purged with nitrogen and again heated to 130° C. A calculated quantity of ethylene oxide (based on the total amount of propylene oxide previously added) was slowly added, while maintaining a pressure of not more than about 60 psi. When the desired amount of ethylene oxide had been added, the reactor was returned to standard conditions.

This process was repeated six times at varying quantities of propylene oxide and ethylene oxide. The result of these sequential alkoxylations was a series of sugar alkoxylates A-G, reported below in Table 1. The sugar alkoxylates differed based on the amount of propylene oxide (PO) and ethylene oxide (EO) used in the alkoxylation reactions.

The sugar alkoxylates reported in Table 1 were generally formed using 1 wt % of a DETA-Gluconate 1:2 adduct (i.e. sugar amide of Example 1), 99 wt % polypropylene oxide, and the compound was then capped with ethylene oxide in the percentage indicated.

TABLE 1

| Sugar Alkoxylate | Chemistry Description |
| --- | --- |
| A | (DETA-Gluconate 1:2 adduct) + PO + 10% EO |
| B | (DETA-Gluconate 1:2 adduct) + PO + 15% EO |
| C | (DETA-Gluconate 1:2 adduct) + PO + 20% EO |
| D | (DETA-Gluconate 1:2 adduct) + PO + 25% EO |
| E | (DETA-Gluconate 1:2 adduct) + PO + 30% EO |
| F | (DETA-Gluconate 1:2 adduct) + PO + 35% EO |
| G | (DETA-Gluconate 1:2 adduct) + PO + 40% EO |

Example 3

The sugar alkoxylates of Example 2 were tested to determine their impact on the water drop data for a sample emulsion.

The activity for each of the sugar alkoxylates in Table 1 was adjusted to 50% using an aromatic solvent. Activity was measured using non-volatile residue analysis.

An emulsion sample was then collected from a satellite pad (i.e. containing commingled well fluids) in West Texas. The American Petroleum Institute (API) gravity of the emulsion sample was between about 35° and 40°.

A bottle test was then conducted on the emulsion sample. 100 ml of the emulsion sample was added to 6 oz. prescription bottles. Fluids were then equilibrated to the intended process temperature of approximately 70° F. Sugar alkoxylates of Table 1 were then introduced into the prescription bottle at a rate of 75 ppm or 150 ppm.

The prescription bottles containing the emulsion and sugar alkoxylates were then placed on an Eberbach shaker and subjected to five minutes of high agitation at a temperature 70° F. Following the agitation, the bottles were placed on a level surface and water drop readings were recorded at intervals of 40 minutes and 1 hour.

A blank (i.e. containing only the emulsion) was also prepared and subjected to the above conditions.

The results of this experiment are reported below in Table 2 and 3.

TABLE 2

75 ppm Treatment

| Sugar Alkoxylate | Rate of polyol (ppm) | Temperature (° F.) | Water Drop at 40 min (ml) | % WD at 40 min | Water Drop at 1 hour (ml) | % WD at 1 hour |
|---|---|---|---|---|---|---|
| — (Blank) | 0 | 70 | 5 | 6.1% | 22 | 26.8% |
| A | 75 | 70 | 10 | 12.2% | 20 | 24.4% |
| B | 75 | 70 | 15 | 18.3% | 40 | 48.8% |
| C | 75 | 70 | 10 | 12.2% | 35 | 42.7% |
| D | 75 | 70 | 30 | 36.6% | 65 | 79.3% |
| E | 75 | 70 | 30 | 36.6% | 60 | 73.2% |
| F | 75 | 70 | 3 | 3.7% | 35 | 42.7% |
| G | 75 | 70 | 30 | 36.6% | 50 | 61.0% |

TABLE 3

150 ppm Treatment

| Sugar Alkoxylate | Rate of polyol (ppm) | Temperature (° F.) | Water Drop at 40 min (ml) | % WD at 40 min | Water Drop at 1 hour (ml) | % WD at 1 hour |
|---|---|---|---|---|---|---|
| — (Blank) | 0 | 70 | 5 | 6.1% | 22 | 26.8% |
| A | 150 | 70 | 20 | 24.4% | 60 | 73.2% |
| B | 150 | 70 | 10 | 12.2% | 25 | 30.5% |
| C | 150 | 70 | 30 | 36.6% | 40 | 48.8% |
| D | 150 | 70 | 20 | 24.4% | 60 | 73.2% |
| E | 150 | 70 | 30 | 36.6% | 55 | 67.1% |
| F | 150 | 70 | 35 | 42.7% | 50 | 61.0% |
| G | 150 | 70 | 55 | 67.1% | 80 | 97.6% |

The water drop amount improved across the series of the sugar alkoxylates. In particular, the oxide levels for sugar alkoxylates D, E, F, and G performed the best on the tested emulsion.

While the high oxide levels of sugar alkoxylates D-G were favorable for the tested emulsion having an API of between about 35° and 40°, the lower oxide sugar alkoxylates A-C may be favorable for other emulsion types such as heavy oils (i.e. having an API of)<20°.

Example 4

In a further experiment, an anionic water-in-oil emulsion polymer was prepared. An aqueous phase was prepared by combining 39.1 g of an acrylamide solution (49.5% in water), 5.1 g of acrylic acid, 0.009 g of ethylenediaminetetraacetic acid tetrasodium salt, 0.002 g of sodium formate, 2.0 g of sodium chloride, and 24.4 g of deionized water. The pH of this aqueous phase was adjusted to a value of approximately 7.5 using a sodium hydroxide solution (50%).

In a separate container, an oil phase was prepared by combining 22.9 g of paraffin oil, 1.1 g of SPAN 80, and 0.8 g of TWEEN 81.

The oil phase was then transferred to a glass reactor equipped with a mechanical stirrer, a nitrogen sparger, and a thermometer. The aqueous phase was added to the reactor while stirring the mixture at approximately 1000 rpm. The mixture was purged with nitrogen for 30 minutes.

After conducting the nitrogen purge, redox initiators comprising tert-butyl hydroperoxide and anhydrous sodium metabisulfite were added to the mixture to initiate the reaction. The aqueous solution of tert-butyl hydroperoxide solution formed by combining 0.0098 g of tert-butyl hydroperoxide in 0.130 g of deionized water. The anhydrous sodium metabisulfite was formed by combining 0.0134 g of sodium metabisulfite and 0.130 g of deionoized water. After the reaction peak was reached, the temperature was raised to 70° C. and an additional 0.01 g of anhydrous sodium metabisulfite was added to the mixture. After holding the temperature at 70° C. for an hour, the mixture was cooled to room temperature and filtered using a 100-mesh screen, resulting in the anionic water-in-oil emulsion polymer.

Example 5

Anionic polymer blends I-VII were prepared by combining 97 parts of the anionic water-in-oil emulsion polymer prepared above in Example 4 with 1 part of an inversion agent (i.e. sugar alkoxylates A-G prepared in Example 2). The combination was stirred at 800 rpm at room temperature using an overhead mixer with a cage-type stirring blade.

After stirring for 30 minutes, 2 parts of an inverting surfactant was added under the same shear and stirred for an additional 30 minutes. The inverting surfactant was an ethoxylated alcohol blend of $C_{11}$-$C_{14}$ isoalkanes. A control sample was also prepared that did not include an inversion agent.

A summary of the resulting blends is set forth below in Table 4.

TABLE 4

| Blend | Latex polymer emulsion | Inverting surfactant | Alkoxylate A | Alkoxylate B | Alkoxylate C | Alkoxylate D | Alkoxylate E | Alkoxylate F | Alkoxylate G |
|---|---|---|---|---|---|---|---|---|---|
| Control | 98 | 2 | — | — | — | — | — | — | — |
| I | 97 | 2 | 1 | — | — | — | — | — | — |
| II | 97 | 2 | — | 1 | — | — | — | — | — |
| III | 97 | 2 | — | — | 1 | — | — | — | — |
| IV | 97 | 2 | — | — | — | 1 | — | — | — |
| V | 97 | 2 | — | — | — | — | 1 | — | — |
| VI | 97 | 2 | — | — | — | — | — | 1 | — |
| VII | 97 | 2 | — | — | — | — | — | — | 1 |

Example 6

The blends of Example 5 were combined with a synthetic seawater solution to determine the invertability of the anionic water-in oil lattices.

A 3.5 wt. % synthetic seawater solution was prepared by blending the components set forth below in Table 5 and filtering the resulting solution through a Whatman 1 filter by suction filtration in order to remove any particulate matter.

TABLE 5

| Component | Amount (g) |
|---|---|
| Sodium chloride (NaCl) | 24.65 |
| Calcium chloride $CaCl_2 \cdot 2H_2O$ | 1.57 |
| Magnesium chloride $(MgCl_2 \cdot 6H_2O)$ | 11.39 |
| Sodium bicarbonate $(NaHCO_3)$ | 0.01 |
| Sodium sulfate $(Na_2SO_4)$ | 4.38 |
| Deionized water | 957.99 |

The invertibility of the anionic water-in-oil lattices was determined by torque monitor technique. The blends of Example 5 were added to a stirring solution of synthetic seawater and the generated torque was monitored as a function of time. The analysis was run for 30 min to confirm the torque remained stable. The stirrer was a Glas-Col Precision Stirrer (available from Glas-Col LLC of Terre Haute, Ind.).

The synthetic seawater was maintained at approximately 4° C. and had an equivalent hardness of 6600 ppm of $CaCO_3$. Each blend of Example 5 was injected into the stirring water as a separate experiment to yield a dilute composition representing 1 wt. % of the total stirring water and added blend. In all cases, at the end of the test, the dilute compositions were observed to be fully dispersed, that is, no residual clumps or aggregates of material were observed.

A maximum torque in range of 100 cm/g was achieved within 1500 seconds for the combination containing the control blend of Example 5, whereas maximum torque in range of 150-250 cm/g was achieved for the blends containing compositions I-VII in the same time. The results are reported in FIG. 1.

A second experiment was conducted wherein the synthetic seawater was maintained at approximately 25° C. and had an equivalent hardness of 6600 ppm of $CaCO_3$.

Figure 2:
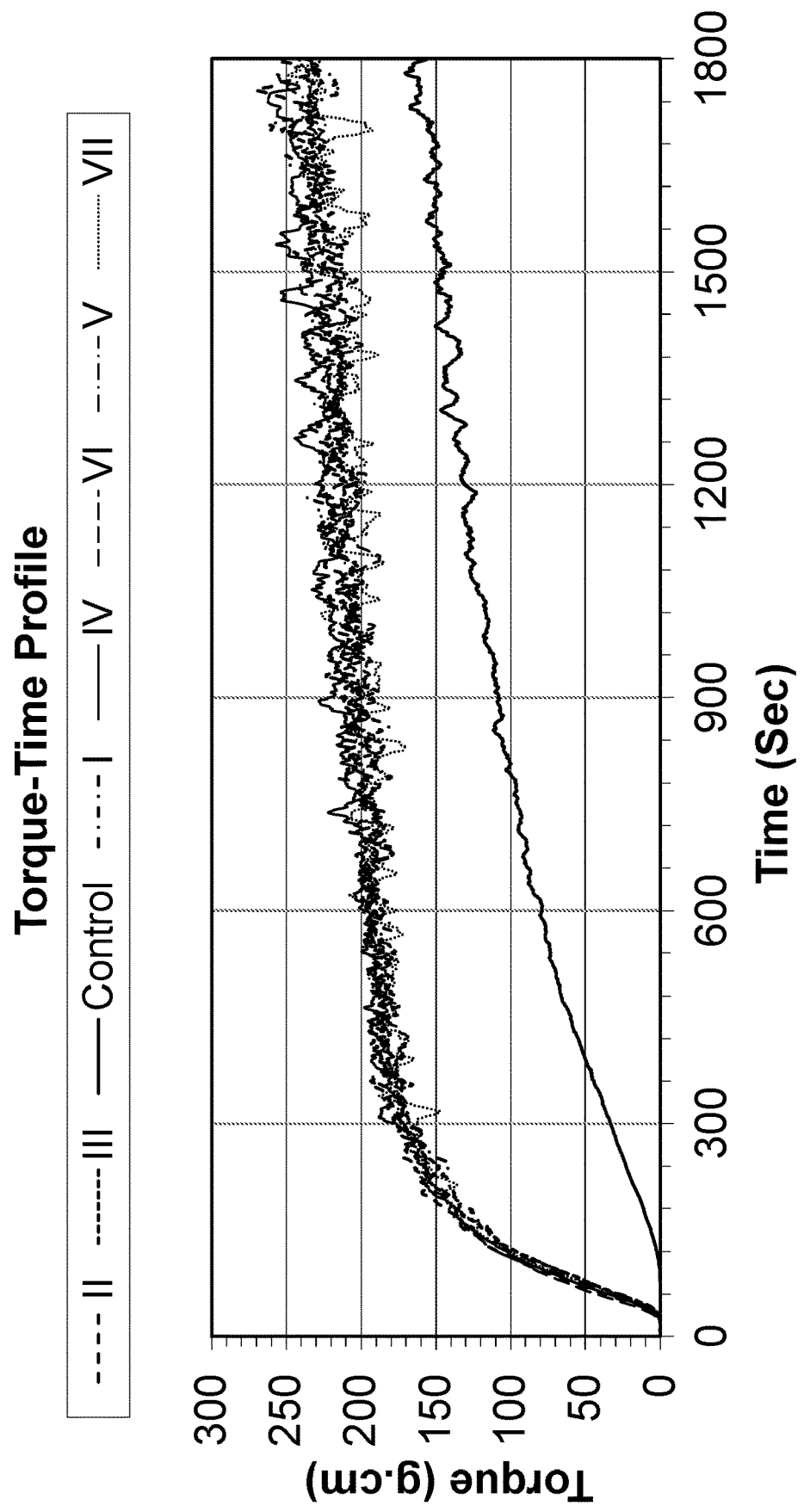
FIG. 2 illustrates the torque profile of the experiment of Example 6 at a temperature of approximately 25° C.

A maximum torque in range of 200-210 cm/g was achieved within 900 seconds for all blends containing compositions I-VII. The results are reported in FIG. 2.

The rate of inversion or rate of viscosity build is an important determinant of activity for anionic water-in-oil emulsion polymers. The plots of torque versus time provided in FIGS. 1 and 2 for these two tests with synthetic seawater allows for a means of evaluating the speed at which inversion has taken place. The slope of the torque versus time curve in the early portion of the experiment demonstrates how rapidly the inversion occurs. Field applications generally require that inversion occurs rapidly. The torque then typically levels off to form a plateau region as time progresses. Higher levels of torque in this plateau region of the figure indicates a higher latex viscosity and better performance of inversion agent.

The results of both of these torque experiments demonstrates that blends comprising an anionic water-in-oil emulsion polymer and a sugar alkoxylate of the present invention provide improved performance as indicated by their higher rate of inversion and higher extent of inversion compared to the control blends.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

The invention claimed is:

1. A surfactant composition comprising a sugar alkoxylate, wherein the sugar alkoxylate is obtained by the process of:
   reacting a sugar lactone with a polyamine, alkanolamine, or combination thereof to form a sugar amide; and
   alkoxylating the sugar amide in the presence of an alkoxylating agent to form the sugar alkoxylate.

2. The composition of claim 1 wherein the molar ratio of sugar lactone to polyamine is about 2:1 or greater.

3. The composition of claim 1 wherein the sugar lactone is selected from the group consisting of 1,5-D-gluconolactone, 1,4-D-galactonolactone, D-mannono-1,4-lactone, ascorbic acid, lactide, d-lactone, d-caprolactone, ε-caprolactone, g-butyrolactone, gluonic acid d-lactone, b-propiolactone, coumarin, whiskey lactone, and combinations thereof.

4. The composition of claim 3 wherein the sugar lactone is 1,5-D-gluconolactone.

5. The composition of claim 1—wherein the polyamine is a polyamine of formula (I): $H_2N$—X—$NH_2$, wherein X is —$(CH_2)_m$—, —(Ar)—, —$(CH_2Ar)_n$—, —$(CH_2)_o$ $Ar(CH_2)_o)_p$—, or —$(CH_2)_qNH(CH_2)_q)_r$—, wherein m, n, o, and q are an integer from 1 to 10 and p and r are an integer from 1 to 100.

6. The composition of claim 1 wherein the polyamine is selected from the group consisting of ethylenediamine, 1,6-hexamethylenediamine, diethylenetriamine, tetraethylenepentamine, 1,3-phenylenediamine, 1,4-phenylenediamine, 1,2-diphenyl-1,2-ethylenediamine, propylenediamine, isopropylenediamine, butylenediamine, piperazine, pentylenediamine piperazine, N,N'-Bis-(2-aminoethyl) piperazine, piperazinoethylethylenediamine, aminoethylpiperazine, triethylenetetramine, pentaethylenehexamine, hexaethyleneheptamine tris(2-aminoethyl)amine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, dimethylaminopropylamine polyethylenepolyamine, and combinations thereof.

7. The composition of claim 1 wherein the molar ratio of alkoxylating agent to sugar amide is at least about 7:1.

8. The composition of claim 1 wherein the alkoxylating agent is selected from the group consisting of ethylene oxide, propylene oxide, styrene oxide, butylene oxide, and combinations thereof.

9. The composition of claim 1 wherein alkoxylating the sugar amide comprises a series of two or more alkoxylations, each comprising an alkoxylating agent.

10. A surfactant composition comprising a sugar alkoxylate, wherein the sugar alkoxylate is obtained by the process of:
   reacting a sugar lactone with a polyamine, alkanolamine, or combination thereof to form a sugar amide; and
   alkoxylating the sugar amide in the presence of an alkoxylating agent to form the sugar alkoxylate;
   wherein the sugar lactone is d-gluconolactone, wherein the polyamine is a polyamine of formula (I): $H_2N$—X—$NH_2$, and wherein the sugar amide is a sugar amide of formula (II):

(II)

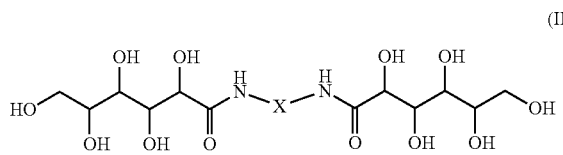

wherein X is —(CH$_2$)$_m$—, —(Ar)—, —(CH$_2$Ar)$_n$—, —(CH$_2$)$_o$Ar(CH$_2$)$_o$)$_p$—, or —(CH$_2$)$_q$NH(CH$_2$)$_q$)$_r$—, wherein m, n, o, and q are an integer from 1 to 10 and p and r are an integer from 1 to 100.

11. The composition of claim 10 wherein alkoxylating the sugar amide of formula (II) comprises:
contacting the sugar amide of formula (II) with propylene oxide to form an intermediate composition; and
contacting the intermediate composition with ethylene oxide to form the sugar alkoxylate.

12. The composition of claim 11 wherein the sugar alkoxylate has the structure of formula (III):

(III)

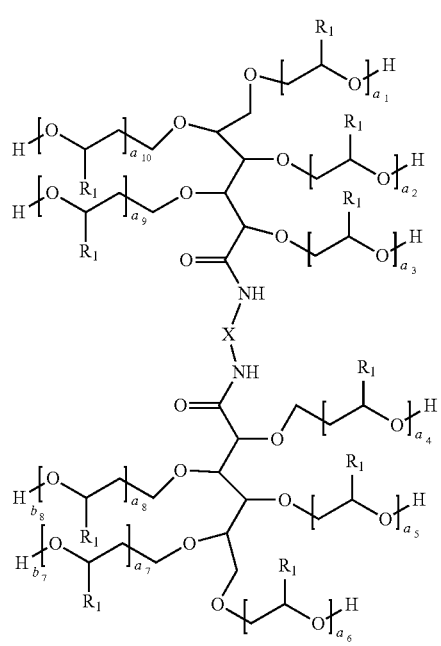

wherein a$_1$ to a$_{10}$ are integers and the sum of a$_1$ to a$_{10}$ is an integer from 1 to 100 and R$_1$ is hydrogen, alkyl, or aryl.

13. The composition of claim 12, wherein R$_1$ is hydrogen, C$_1$ to C$_8$ alkyl, or phenyl.

14. The composition of claim 12, wherein R$_1$ is hydrogen or methyl.

15. The composition of claim 11, wherein the sugar alkoxylate has the structure of Formula IIIA:

(IIIA)

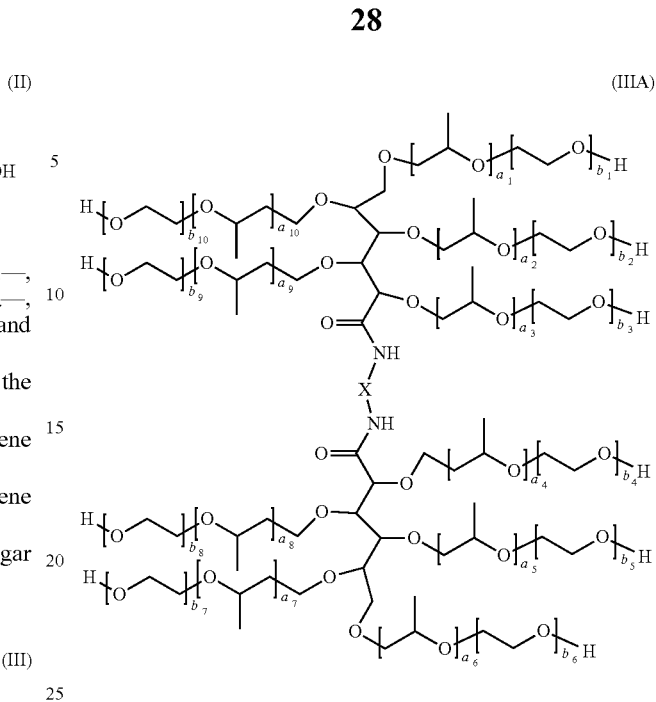

wherein b$_1$ to b$_{10}$ are integers and the sum of the integers of b$_1$ to b$_{10}$ is 1 to 100.

16. A polymer composition comprising:
a water-in-oil emulsion comprising an aqueous phase comprising water and a water-soluble or water-dispersible polymer, and an oil phase comprising an oil and an emulsifying agent;
an inverting surfactant; and
a surfactant composition comprising a sugar alkoxylate, wherein the sugar alkoxylate is obtained by the process of:
reacting a sugar lactone with a polyamine, alkanolamine, or combination thereof to form a sugar amide; and
alkoxylating the sugar amide in the presence of an alkoxylating agent to form the sugar alkoxylate.

17. A method of dissolving the water-soluble or water-dispersible polymer of the polymer composition of claim 16 comprising contacting the water-in-oil emulsion with the surfactant composition.

18. A method of breaking an emulsion of water and oil comprising introducing an effective amount of an emulsion breaker composition into contact with the emulsion to destabilize the emulsion, wherein the emulsion breaker composition comprises a surfactant composition of claim 1.

19. A method of inverting an emulsion of water and oil comprising introducing an effective amount of an emulsion inverter composition into contact with the emulsion to destabilize the emulsion, wherein the emulsion inverter composition comprises a surfactant composition of claim 1.

20. A method of inhibiting bio-film comprising introducing an effective amount of a bio-film inhibitor, wherein the bio-film inhibitor comprises a surfactant composition of claim 1.

* * * * *